(12) United States Patent
Nogawa

(10) Patent No.: US 10,057,433 B2
(45) Date of Patent: Aug. 21, 2018

(54) IMAGE FORMING APPARATUS, OPERATION CONTROL METHOD AND NON-TRANSITORY COMPUTER-READABLE STORAGE MEDIUM STORING OPERATION CONTROL PROGRAM

(71) Applicant: KONICA MINOLTA, INC., Chiyoda-ku, Tokyo (JP)

(72) Inventor: Hiroshi Nogawa, Hachioji (JP)

(73) Assignee: KONICA MINOLTA, INC., Tokyo (JP)

( * ) Notice: Subject to any disclaimer, the term of this patent is extended or adjusted under 35 U.S.C. 154(b) by 65 days.

(21) Appl. No.: 15/005,517

(22) Filed: Jan. 25, 2016

(65) Prior Publication Data

US 2016/0224298 A1 Aug. 4, 2016

(30) Foreign Application Priority Data

Feb. 2, 2015 (JP) .................. 2015-018212

(51) Int. Cl.
*G06K 15/00* (2006.01)
*G06F 3/12* (2006.01)
*H04N 1/00* (2006.01)

(52) U.S. Cl.
CPC .......... *H04N 1/00* (2013.01); *H04N 1/00885* (2013.01); *H04N 1/00917* (2013.01); *H04N 1/00928* (2013.01)

(58) Field of Classification Search
CPC .............. G06F 11/2015; G06F 21/608; G06F 2221/2143; G06F 2215/0085;

(Continued)

(56) References Cited

U.S. PATENT DOCUMENTS

| 7,730,541 | B2 | 6/2010 | Kawaguchi et al. |
| 2005/0013643 | A1* | 1/2005 | Fukano .................. G06K 15/00 400/76 |

(Continued)

FOREIGN PATENT DOCUMENTS

| JP | 2006093963 A | 4/2006 |
| JP | 2013182577 A | 9/2013 |
| JP | 2013231850 A | 11/2013 |

OTHER PUBLICATIONS

Japanese Office Action (and English translation thereof) dated Feb. 14, 2017 issued in counterpart Japanese Application No. 2015-018212.

*Primary Examiner* — Chad Dickerson
(74) *Attorney, Agent, or Firm* — Holtz, Holtz & Volek PC

(57) ABSTRACT

An image forming apparatus includes a control section and a hardware device controlled by execution of a job execution program. The control section includes a CPU and a non-volatile memory which stores the job execution program and working data created by execution of the job execution program. The control section includes a program monitoring section that, in accordance with a status of execution of the job execution program, determines a job execution status at power-off of the apparatus; and a matching section that, on the basis of a result of determining the job execution status, determines whether an execution status of the job execution program and an operation status of the hardware device match at start-up of the apparatus. On determining that the execution status and the operation status do not match at the start-up, the matching section deletes the working data in the non-volatile memory.

15 Claims, 5 Drawing Sheets

(58) Field of Classification Search
CPC ............ G06F 12/0238; G06F 12/0246; G06F 3/0604; G06K 15/00; G06K 15/4055; G11C 16/22; G03G 15/5012; G03G 15/502; H04N 1/00917; H04N 1/00928; H04N 1/00965; H04N 1/32486; H04N 2201/0094; H04N 2201/3288; H04N 2201/3295; H04B 3/142; H04L 25/03133
USPC ............ 358/1.1, 1.11–1.18; 39/82; 711/100, 711/103; 320/167; 700/82; 726/26, 36; 399/82
See application file for complete search history.

(56) References Cited

U.S. PATENT DOCUMENTS

| | | | |
|---|---|---|---|
| 2006/0080494 A1* | 4/2006 | Kawaguchi | G06F 11/2015 711/4 |
| 2008/0292353 A1* | 11/2008 | Sato | G03G 15/5012 399/82 |
| 2013/0229681 A1 | 9/2013 | Murata et al. | |
| 2015/0052341 A1* | 2/2015 | Saiki | G06F 9/4406 713/2 |

* cited by examiner

IMAGE FORMING APPARATUS, OPERATION CONTROL METHOD AND NON-TRANSITORY COMPUTER-READABLE STORAGE MEDIUM STORING OPERATION CONTROL PROGRAM

The entire disclosure of Japanese Patent Application No. 2015-018212 filed on Feb. 2, 2015 including description, claims, drawings, and abstract are incorporated herein by reference in its entirety.

TECHNICAL FIELD

The present invention relates to an image forming apparatus, an operation control method and a non-transitory computer-readable storage medium storing an operation control program. Particularly, the present invention relates to an image forming apparatus which includes a non-volatile memory as a storage area; and a method and a non-transitory computer-readable storage medium storing a program, for controlling the operation of the image forming apparatus.

BACKGROUND

General image forming apparatuses like digital MFPs (Multi-Function Peripherals) are equipped with a non-volatile storage device, such as a HDD (Hard Disk Drive) and a SSD (Solid State Drive), and with a volatile storage device, such as a DRAM (Dynamic Random Access Memory). Non-volatile storage devises operate at a relatively low speed but are capable of retaining stored data even when not powered. On the other hand, volatile storage devices operate at a relatively high speed but are capable of retaining stored data only when powered. Therefore, in general, non-volatile storage devices are used to store data and programs which need to be retained even when not powered, and volatile storage devices are used to store working data to be created or referred to during execution of a program.

On the other hand, in these years, new types of non-volatile storage device which realize higher speed, lower power consumption and a higher level of reliability in comparison with conventional non-volatile storage devices (like SSDs and HDDs) are coming into the market. Example of such non-volatile storage devices include NVDIMMs (Non-Volatile Dual In-line Memory Modules), MRAMs (Magnetoresistive Random Access Memories) and ReRAMs (Resistance Random Access Memories). Image forming apparatuses are being expected to realize fast startup and fast processing by employing such kind of non-volatile storage device to form all the storage area of the apparatus.

DESCRIPTION OF THE RELATED ART

As an example of the program control in an apparatus employing such a non-volatile memory, Japanese Unexamined Patent Publication (JP-A) No. 2013-182577 discloses the following information processing apparatus. The information processing apparatus includes an execution unit that executes a program, and a main storage unit. The main storage unit includes a first non-volatile memory which is readable and writable and is capable of retaining stored information even when no power is supplied. The main storage unit has a first storage area which stores the program to be executed by the execution unit and a second storage area which stores data generated by the execution of the program by the execution unit. The information processing apparatus further includes a connection unit that connects the execution unit and the main storage unit, and a condition storage unit that includes a second non-volatile memory which is readable and writable and is capable of retaining stored information even when no power is supplied. The condition storage unit stores conditions which are set by the connection unit to transmit and receive the program and the data between the execution unit and the main storage unit.

In the information processing apparatus disclosed in JP-A No. 2013-182577, program data and working data generated by execution of the program are stored in a non-volatile memory, and a matching between data relating to the program inside a CPU (Central Processing Unit) are checked at the next power-on. If determined that the data relating to a program do not match, the apparatus is booted up from a ROM (Read Only Memory), and if determined that the data relating to a program match, the apparatus is booted up from the non-volatile memory. With this control, a mismatch between the data relating to a program can be avoided.

Herein, it is considered an example that an apparatus includes various kinds of hardware devices and these hardware devices are controlled by execution of a program. If the apparatus is an image forming apparatus which includes hardware devices of an image reading unit (scanner), image processing unit (ASIC or Application-Specific Integrated Circuit) and image forming unit (print engine), the apparatus can create a condition that data relating to a program match (in other words, a status or progress of execution of a program and data referred to during the execution of the program match) but a status of execution of the program and a status of operation of a hardware device do not match.

For example, if power of the apparatus has been cut off (due to a power failure, user's intended operation or user's erroneous operation) during execution of a program which causes the CPU to execute job processing, the non-volatile memory retains working data (such as status management data and image data) used during the execution of the program which has been interrupted by the power-off. At the next power-on, the program is executed by using the retained working data in order to resume the job processing from the point of interruption. On the other hand, hardware devices, such as an image reading unit, image processing unit and image forming unit start in the initialized state at the power-on. It results in a mismatch between a status (or progress) of execution of the program and a status of operation of the hardware devices (in other words, a mismatch between working data stored in the non-volatile memory and settings of the hardware devices), which may cause a problem that the hardware devices cannot operate normally at power-on of the apparatus.

SUMMARY

Aspects of the present inventions are directed to image forming apparatuses employing a non-volatile memory as a storage area, in which data created by execution of a program is stored, operation control methods and non-transitory computer-readable storage media each storing an operation control program, which can avoid that working data retained in the volatile-memory during the power-off of the image forming apparatus makes a mismatch between an execution status of the program and an operation status of a hardware device.

An image forming apparatus reflecting one aspect of the present invention is an image forming apparatus comprising: a control section and a hardware device. The control section includes a central processing unit (CPU) and a non-volatile memory which is readable and writeable and is capable of retaining stored information regardless of power is supplied to the non-volatile memory. The non-volatile memory stores a job execution program which, when executed by the CPU, causes the CPU to execute job processing and working data created by execution of the job execution program. The hardware device is controlled by execution of the job execution program. The control section includes a program monitoring section that, in accordance with a status of execution of the job execution program, determines whether a job execution status at power-off of the image forming apparatus is a state of executing a job or a state of waiting for a job. The control section further includes a matching section that, on a basis of a result of determination of the job execution status, determines whether a status of execution of the job execution program and a status of operation of the hardware device controlled by the execution of the job execution program match at start-up of the image forming apparatus. On determining that the status of the execution of the job execution program and the status of the operation of the hardware device do not match at the start-up, the matching section deletes the working data recorded at the power-off in the non-volatile memory.

A method reflecting one aspect of the present invention is a method of controlling operation of an image forming apparatus. The image forming apparatus includes a control section and a hardware device. The control section includes a central processing unit (CPU) and a non-volatile memory which is readable and writeable and is capable of retaining stored information regardless of power is supplied to the non-volatile memory. The non-volatile memory stores a job execution program which, when executed by the CPU, causes the CPU to execute job processing and working data created by execution of the job execution program. The hardware device is controlled by execution of the job execution program. The method comprises, in accordance with a status of execution of the job execution program, first determining whether a job execution status at power-off of the image forming apparatus is a state of executing a job or a state of waiting for a job. The method further comprises, on a basis of a result of the first determining, second determining whether a status of execution of the job execution program and a status of operation of the hardware device controlled by the execution of the job execution program match at start-up of the image forming apparatus. The method further comprises, on determining that the status of the execution of the job execution program and the status of the operation of the hardware device do not match at the start-up, deleting the working data recorded at the power-off in the non-volatile memory.

An illustrative non-transitory computer-readable storage medium reflecting one aspect of the present invention stores a program for controlling operation of an image forming apparatus. The image forming apparatus includes a control section and a hardware device. The control section includes a central processing unit (CPU) and a non-volatile memory which is readable and writeable and is capable of retaining stored information regardless of power is supplied to the non-volatile memory. The non-volatile memory stores a job execution program which, when executed by the CPU, causes the CPU to execute job processing and working data created by execution of the job execution program. The hardware device is controlled by execution of the job execution program. The program for controlling operation of the image forming apparatus, when being executed by the CPU, causes the CPU to perform the following processing. The processing comprises, in accordance with a status of execution of the job execution program, first determining whether a job execution status at power-off of the image forming apparatus is a state of executing a job or a state of waiting for a job. The processing further comprises, on a basis of a result of the first determining, second determining whether a status of execution of the job execution program and a status of operation of the hardware device controlled by the execution of the job execution program match at start-up of the image forming apparatus. The processing further comprises, on determining that the status of the execution of the job execution program and the status of the operation of the hardware device do not match at the start-up, deleting the working data recorded at the power-off in the non-volatile memory.

Other features of illustrative embodiments will be described below.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention, and wherein.

DESCRIPTION OF THE PREFERRED EMBODIMENTS

Figure 1:
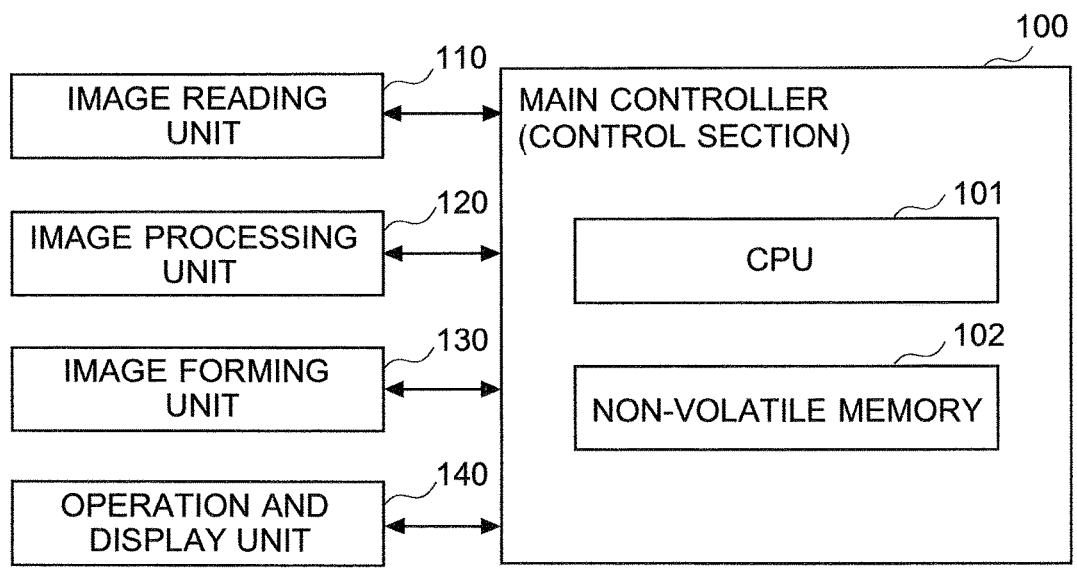
FIG. 1 is a block diagram illustrating an example of the structure of an image forming apparatus of Example 1.

Hereinafter, an embodiment of the present invention will be described with reference to the drawings. However, the scope of the invention is not limited to the illustrated examples.

According to image forming apparatuses, operation control methods and non-transitory computer-readable storage media each storing an operation control program as embodiments of the present invention, there can be provided an image forming apparatus including a non-volatile memory as a storage area which stores working data created by execution of a program, and being capable of avoiding that the working data retained in the volatile-memory during power-off of the apparatus makes a mismatch between an execution status of the program and an operation status of a hardware device, for the following reason.

The control section performs the following control, when executing the operation control program, in the image forming apparatus equipped with a non-volatile memory which stores a job execution program (which causes the CPU to execute job processing) and working data created by execution of the job execution program. The control section determines whether a job execution status at power-off of the image forming apparatus is a state of executing a job or not in accordance with a status of execution of the job execution program, and optionally records a result of the determination in the non-volatile memory. The control section further determines whether a status (or progress) of execution of the job execution program and a status of operation of a hardware device match at start-up of the apparatus, on the basis of the determination result of the job execution status at the power-off. If determining that the execution status of the job execution program and the operation status of the hardware device do not match at the start-up, the control section deletes the working data in the non-volatile memory.

As described in the above, various kinds of non-volatile memory, such as NVDIMMs, MRAM and ReRAM, as new non-volatile storage devices are coming into the market and are coming into use in image forming apparatuses. However, use of such a non-volatile memory as a storage area of the apparatus can make problems that have never happened before.

For example, in an image forming apparatus in which a non-volatile memory forms a main storage area (a storage area of a control section, or the like) of the apparatus, the non-volatile memory stores a job execution program and working data created by execution of the program. In such an apparatus, even when no power is supplied to the apparatus, the stored data are not deleted and are retained in the non-volatile memory. If the power of the apparatus has been turned off during execution of the job execution program because of a power failure, user's intended operation or user's erroneous operation, it can cause a mismatch between the stored data relating to the program and a hardware device which is controlled by the execution of the program at the next power-on of the apparatus. That is, after the power-on of the apparatus, the execution of the program starts by using the working data (such as status management data and image data) stored in the non-volatile memory so as to resume the job processing from the point of interruption at the last power-off. On the other hand, the hardware device starts with being initialized at the power-on of the apparatus, which may cause a problem that the hardware devices cannot operate normally at the power-on of the apparatus.

In view of that, there is provided an image forming apparatus as an embodiment reflecting one aspect of the present invention, which realizes fast start-up and fast processing by employing a non-voluntary memory for a storage area of the control section thereof and performs the following control. The control section (when executing an operation control program) determines whether a job execution status at power-off of the apparatus is a state of executing a job (a job execution state) or a state of waiting for a job (a job waiting state, or a state of executing no job) and optionally records a result of the determination in the non-volatile memory. The control section further determines whether a status or progress of execution of the program and a status or progress of operation of the hardware device match at power off of the apparatus, on the basis of the determination result about the job execution status. For example, if determining that the job execution status at power-off of the apparatus is a state of executing a job, the control section determines that they do not match, and if determining that the job execution status at power-off of the apparatus is a state of waiting for a job, the control section determines that they match. On determining that they do not match, the control section deletes job data (working data) which was used by the execution of the program interrupted by the last power-off and remains in the non-volatile memory.

This control is provided so as to coordinate the execution of the job execution program and the operation of a hardware device, such as an ASIC for image processing, a print engine and a scanner (in other words, to ensure a matching between working data in the non-volatile memory, which is referred to or used by execution of the job execution program, and settings of the hardware device which starts in an initialized state at start-up of the apparatus), and thereby, the hardware device can operate normally.

In this control, the control section deletes data only in a work area for storing working data, of the non-volatile memory, and does not delete data which are necessary to be retained during power-off of the apparatus (data which were stored in a SSD or a HDD in conventional apparatuses) and counter information. In the case that the apparatus was turned off as being in a job waiting state, working data retained in the non-volatile memory would not cause the above-described problem (because the execution of the program also starts in an initial state at start-up of the apparatus in this case). Therefore, the image forming section starts up without deleting working data.

EXAMPLE

Example 1

Figure 2:
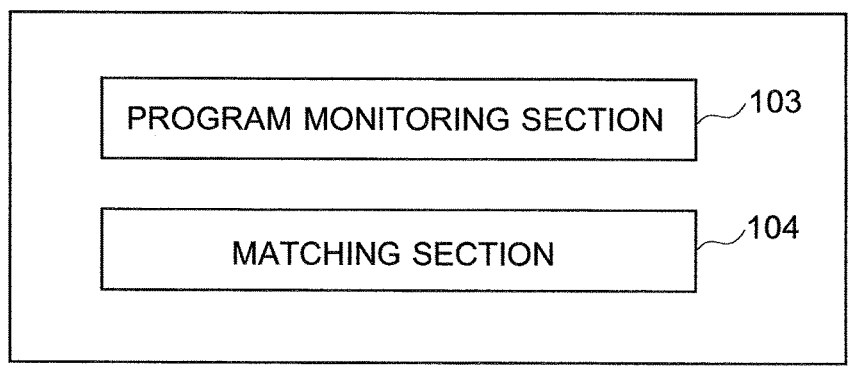
FIG. 2 is a block diagram illustrating an example of functions activated by a main controller (control section) of the image forming apparatus of Example 1.
Figure 3:
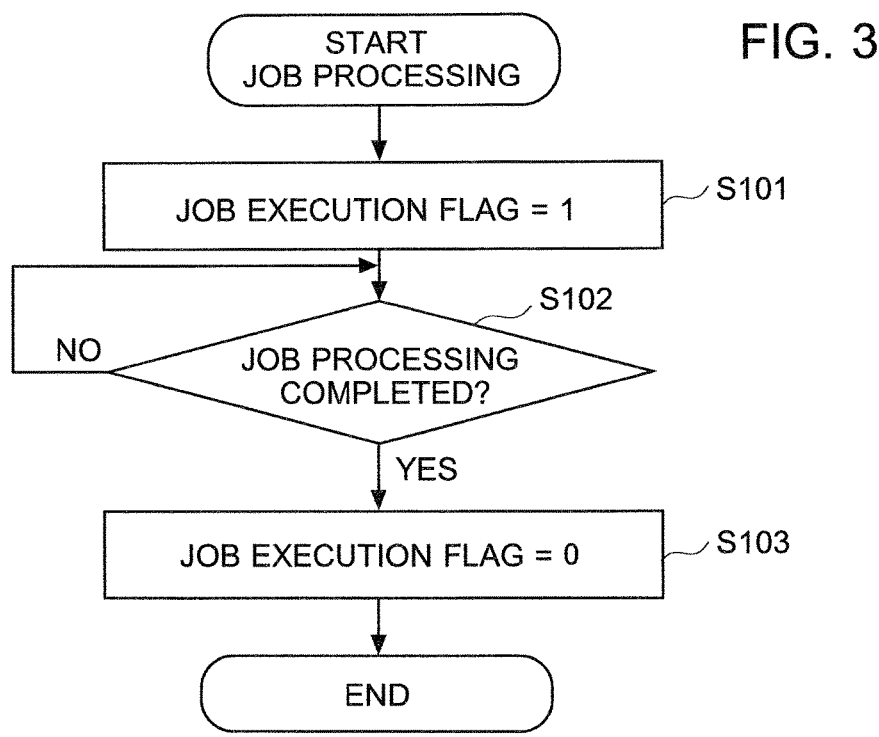
FIG. 3 is a flowchart illustrating an example of the operation (during job processing) of the main controller (control section) of the image forming apparatus of Example 1.
Figure 4:
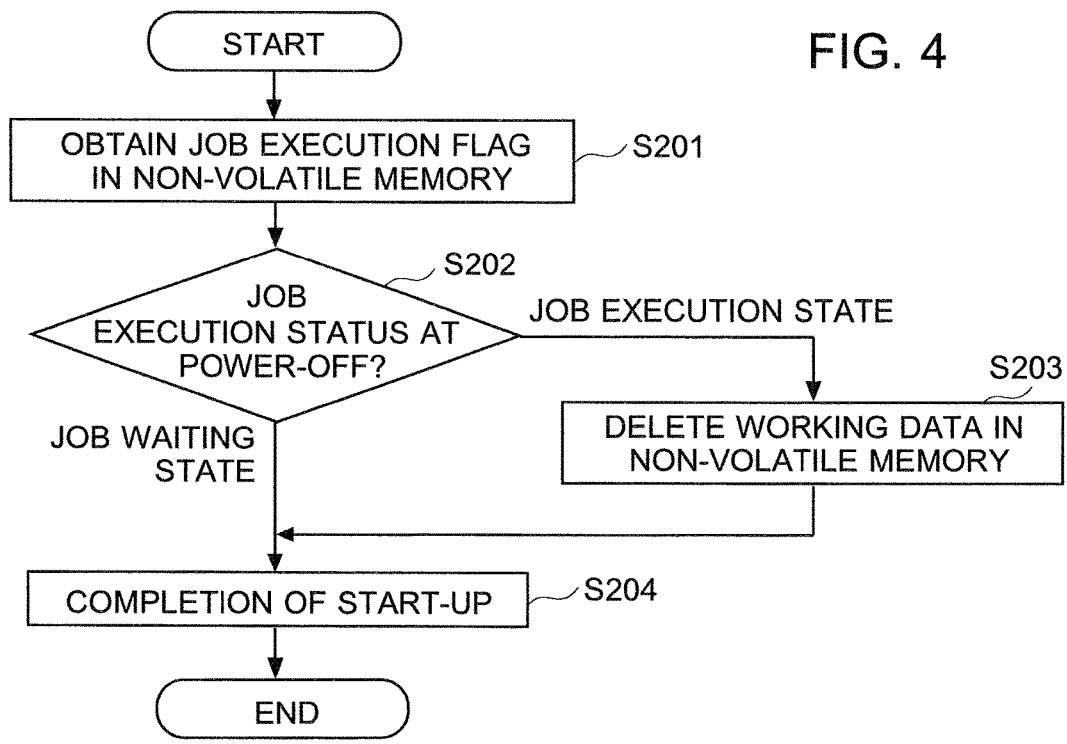
FIG. 4 is a flowchart illustrating an example of the operation (at power-on of the apparatus) of the main controller (control section) of the image forming apparatus of Example 1.

An example of the image forming apparatus, operation control method and non-transitory computer-readable storage medium storing an operation control program will be described with reference to FIGS. 1 to 4 so as to describe the above-described embodiments in detail. FIG. 1 is a block diagram illustrating the structure of an image forming apparatus of the present example. FIG. 2 is a block diagram illustrating an example of functions activated by a main controller (control section) of the image forming apparatus. FIG. 3 and FIG. 4 are flowcharts illustrating an example of the operation of the main controller (control section) of the image forming apparatus.

An example of apparatuses to which the above-described control can be applied is an image forming apparatus like a MFP (Multi-Function Peripheral). There is provided, in the present example, an image forming apparatus including main controller (control section) 100, image reading unit (scanner) 110, image processing unit (ASIC) 120, image forming unit (print engine) 130 and operation and display unit (operation panel) 140 as illustrated in FIG. 1.

Main controller (control section) 100 includes CPU 101 as an operation processor and non-volatile memory 102 which is readable and writable and can retain stored information even when not powered.

Examples of the non-volatile memory 102 include a NVDIMM, MRAM and ReRAM. Non-volatile memory 102 stores various types of data including a job execution program to be executed by CPU 101, working data (job data) created by the execution of the job execution program through CPU 101, and data of a display screen to be sent to operation and display unit 140. Non-volatile memory 102 further stores information indicating whether a job execution status is a state of executing a job or not (status determining information like a job execution flag which will be described later).

CPU 101, when executing a program loaded onto non-volatile memory 102, receives user's operations through operation and display unit 140 and performs predetermined control on image reading unit 110, image processing unit 120, image forming unit 130 and operation and display unit 140.

Image reading unit 110, image processing unit 120, image forming unit 130 and operation and display unit 140 are controlled by main controller 100 to activate functions of the image forming apparatus.

Image reading unit (scanner) 110 is a part which optically scans an original loaded on an original glass or glass platen of the image forming apparatus to obtain image data. The image reading unit 110 includes light sources to be used to scan the original, image sensors like CCDs (Charge Coupled Devices) which convert light reflected on the original into electrical signals, and A/D converters which carry out A/D conversion by using the electric signals. The image reading unit 110 outputs the image data obtained by scanning the original, to main controller 100.

Image processing unit (ASIC) 120 performs image processing, such as compression, edge enhancement, smoothing and color conversion, on the image data of the original obtained through image reading unit 110. On receiving print data in PDL (Page Description Language), as exemplified in PostScript and PCL (Printer Control Language), from another apparatus, image processing unit 120 rasterizes pages contained in the print data to create image data of the each page, and performs the above-described image processing on the image data of each page. Then, image processing unit 120 outputs the processed image data to main controller 100.

Image forming unit (print engine) 130 receives the image data, on which image processing unit 120 performed image processing, and prints the image data on a sheet of paper as follows. In concrete terms, if it is an electrophotographic print engine, an exposure unit of the image forming unit 130 irradiates a photoreceptor drum, which was charged by a charging unit, with light according to an image, and forms an electrostatic latent image on the photoreceptor drum. A developing unit adheres toner onto the photoreceptor drum to develop the image. The image of toner is transferred onto a transfer belt (first transfer process) and is further transferred onto a sheet of paper fed by a sheet feeding unit (second transfer process). A fixing unit fixes the image of toner on the sheet and sends the sheet to a sheet ejecting unit.

Operation and display unit (operation panel) 140 includes a touch screen and hardware keys. The touch screen includes a display unit such as a LCD (Liquid Crystal display); and an operations unit, such as a touch sensor, which includes electrodes arranged in a lattice shape put on the display unit. Operation and display unit 140 presents a user an operation screen of the image forming apparatus on the basis of data of a display screen stored in non-volatile memory 102, receives user's operations performed on the screen and outputs signals corresponding to the user's operations to main controller 100.

In the present example, description was given to an image forming apparatus including image reading unit 110, image processing unit 120, image forming unit 130 and others. However, it should be noted that the described components are not essential to the image forming apparatus reflecting an aspect of the present invention, and the following apparatuses can be the image forming apparatus, such as a mono-functional printer which does not include image reading unit 110, a printer controller which does not include image reading unit 110 and image forming unit 130, a RIP (Raster Image Processor) controller which does not include image reading unit 110 and image forming unit 130, and a facsimile machine equipped with communication function using telephone infrastructure.

The image forming apparatus employs non-volatile memory 102 for a storage area of main controller 100, and is configured to store in non-volatile memory 102 working data (job data), which were retained in a volatile memory in conventional image forming apparatuses. In this apparatus, working data is not deleted at power-off of the apparatus. Therefore, if power of the apparatus has been turned off (due to a power failure, user's intended operation or user's erroneous operation) during execution of a job execution program, the working data (including status management data and image data) which were partially processed because of interruption of the execution of the program, still remains in non-volatile memory 102 at the next power-on of the apparatus. The execution of the job execution program starts at the next power-on with referring to the working data so as to resume job processing from the point of interruption. It results in an occurrence of mismatching between a status or progress of the execution of the program and a status or progress of the operation of a hardware device (for example, at least one of image reading unit 110, image processing unit 120 and image forming unit 130) which starts in an initialized state at power-on of the apparatus, which can cause a problem that the hardware device does not operate normally.

In view of that, main controller (control section) 100 of the image forming apparatus of the present example serves as program monitoring section 103 and matching section 104 so as to solve the mismatching of an execution status of the program and an operation status of the hardware device and then secure normal operation of the hardware device.

In concrete terms, program monitoring section 103 monitors execution of a job execution program to determine whether a job execution status is a state of executing a job (a job execution state) or a state of waiting for a job (a job waiting state), and records status determining information indicating the job execution status into non-volatile memory 102 in accordance with whether the job execution status is the job execution state or the job waiting state. For example, at a start of job execution, program monitoring section 103 sets a job execution flag (or sets the job execution flag to "1"), and clears the job execution flag (or sets the job execution flag to "0") in response to the job execution being stopped and the apparatus becoming in the job waiting state.

At power-on of the image forming apparatus, matching section 104 refers to the status determining information stored in non-volatile memory 102 and determines whether the job execution status at the last power-off of the image forming apparatus was the state of executing a job. If determining that the job execution status at the power-off was the state of executing a job (the job execution flag is set to "1"), since working data on which job processing was partially executed is stored in non-volatile memory 102, matching section 104 determines that an execution status of the program and an operation status of the hardware device do not match (in other words, working data stored in non-volatile memory 102 and settings of the hardware do not match). Then, matching section 104 deletes the working data stored in non-volatile memory 102.

The program monitoring section 103 and matching section 104 may be provided as hardware devices. Alternatively, the program monitoring section 103 and matching section 104 may be provided by a software (operation control program) which causes the control section 100 to function as these sections when being executed. That is, main controller (control section) 100 may be configured to serve as the program monitoring section 103 and matching section 104, when CPU 101 executes the operation control program. Operation and display section (operation panel) 140 also starts up in an initialized state at power-on of the apparatus. However, main controller 100 periodically accesses non-volatile memory 102 to update data of the display screen, which does not cause a problem about the above-described mismatching. Therefore, the operation and display section (operation panel) 140 is not subject to the control of program monitoring section 103 and matching section 104.

Hereinafter, description is given to the operation of the main controller 100 of the image forming apparatus having the above structure of the present example, with reference to FIG. 3 and FIG. 4. CPU 101, when executing an operation control program stored in non-volatile memory 102, executes the processes of the steps of the flowcharts illustrated in FIG. 3 and FIG. 4.

Operation During Job Processing:

As illustrated in FIG. 3, when execution of a job execution program starts and thereby job processing starts, main controller 100 (program monitoring section 103) sets a job execution flag (set the job execution flag to "1") (S101). Then, main controller 100 (program monitoring section 103) monitors a status of execution of the program (S102), and clears the job execution flag (set the job execution flag to "0") in response to a completion of the job processing (S103). Since the job execution flag is recorded in non-volatile memory 102, the job execution flag keeps on being set even if power of the image forming apparatus has been turned off during the execution of the job execution program.

Operation at Power-on:

As illustrated in FIG. 4, when the power of the image forming apparatus is turned on after the power-off, main controller 100 (matching section 104) obtains the job execution flag recorded in non-volatile memory 102 (S201). Then, on the basis of the obtained job execution flag, main controller 100 (matching section 104) determines whether the job execution status at the last power-off was a state of executing a job (job execution state) or a state of waiting for a job (job waiting state), in other words, determines whether working data in non-volatile memory 102 and settings of a hardware device such as image reading unit 110, image processing unit 120 and image forming unit 130 match or not (S202).

If the job execution flag is not set (or the job execution flag is set to "0"), in other words, the job execution was in a job waiting state at the last power-off, main controller 100 (matching section 104) determines that the working data and the settings of the hardware device match, and determines that the start-up processing of the apparatus has been completed (S204). On the other hand, if the job execution flag is set (or the job execution flag is set to "1"), in other words, the job execution was in the job execution state at the last power-off, main controller 100 (matching section 104) determines that the working data and the settings of the hardware device do not match, deletes working data in non-volatile memory 102 (S203) and then determines that the start-up processing of the apparatus has been completed (S204).

As described above, the main controller 100 records in non-volatile memory 102 a job execution flag which indicates that a job execution status is the job execution state or the job waiting state, and at the next power-on of the apparatus, determines the job execution status at the last power-off of the apparatus on the basis of the job execution flag. If the job execution at the last power-off of the apparatus was in the job execution state, the main control section 100 deletes working data in non-volatile memory 102. This control makes working data in non-volatile memory 102 and settings of the hardware device match at all times, in other words, coordinates the execution of the program and the operation of the hardware device at all times.

If the image forming apparatus is configured to store a program counter in non-volatile memory 102, the examination of an interrupted program resumes immediately after power-on of the apparatus (before execution of the operation control program of the present example starts). In view of that, the main controller 100 may be configured to generate a high-priority interrupt and does not resume the interrupted program at power-on of the apparatus, so as to execute the operation control program of the present example first. As a way to execute the operation control program, there can be considered another way to use a CPU (like a sub-CPU) only for start-up of the apparatus, other than the way to generate an interrupt at power-on of the apparatus, which was described above. In the latter way, the CPU only for start-up of the apparatus may be configured to execute the operation control program after power-on of the apparatus, and a main CPU may be configured to resume the interrupted program after the execution of the operation control program.

Example 2

Figure 5:
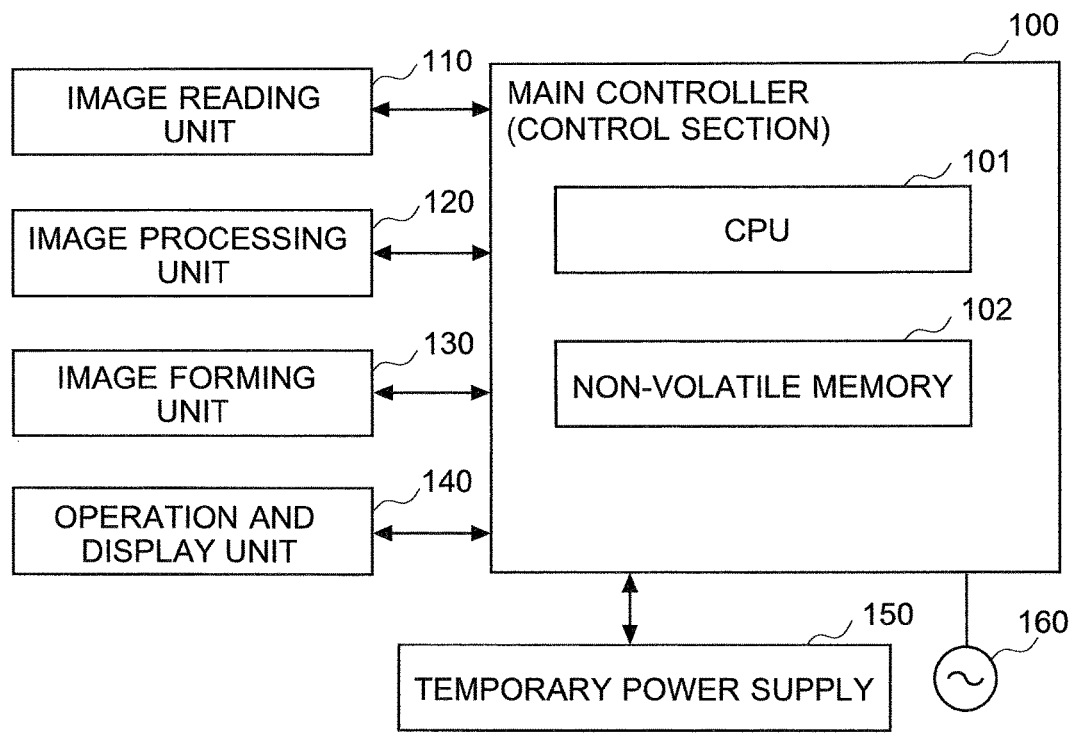
FIG. 5 is a block diagram illustrating an example of the structure of an image forming apparatus of Example 2.
Figure 6:
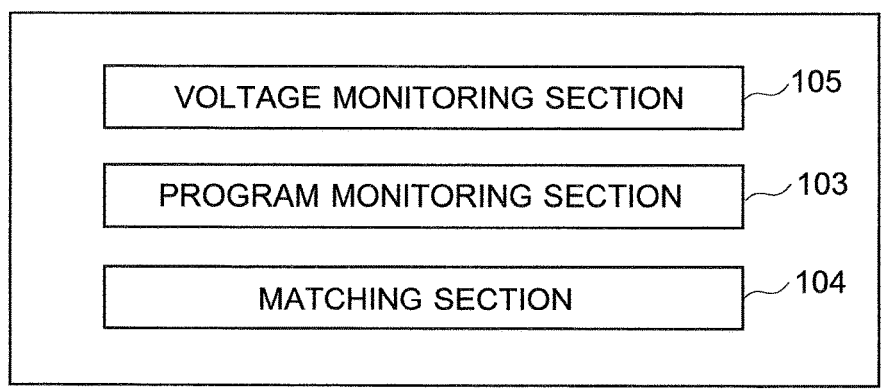
FIG. 6 is a block diagram illustrating an example of functions activated by a main controller (control section) of the image forming apparatus of Example 2.
Figure 7:
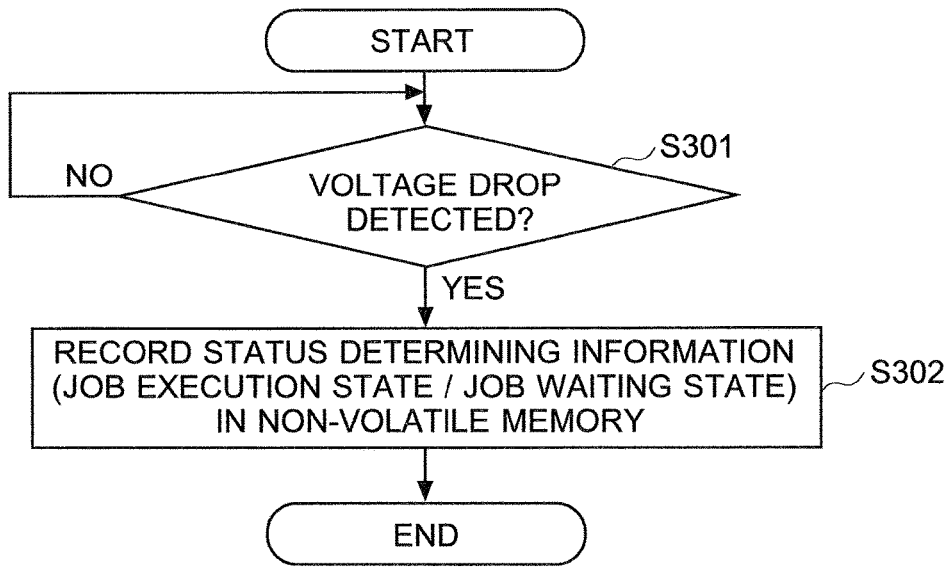
FIG. 7 is a flowchart illustrating an example of the operation (at power-off of the apparatus) of the main controller (control section) of the image forming apparatus of Example 2.
Figure 8:
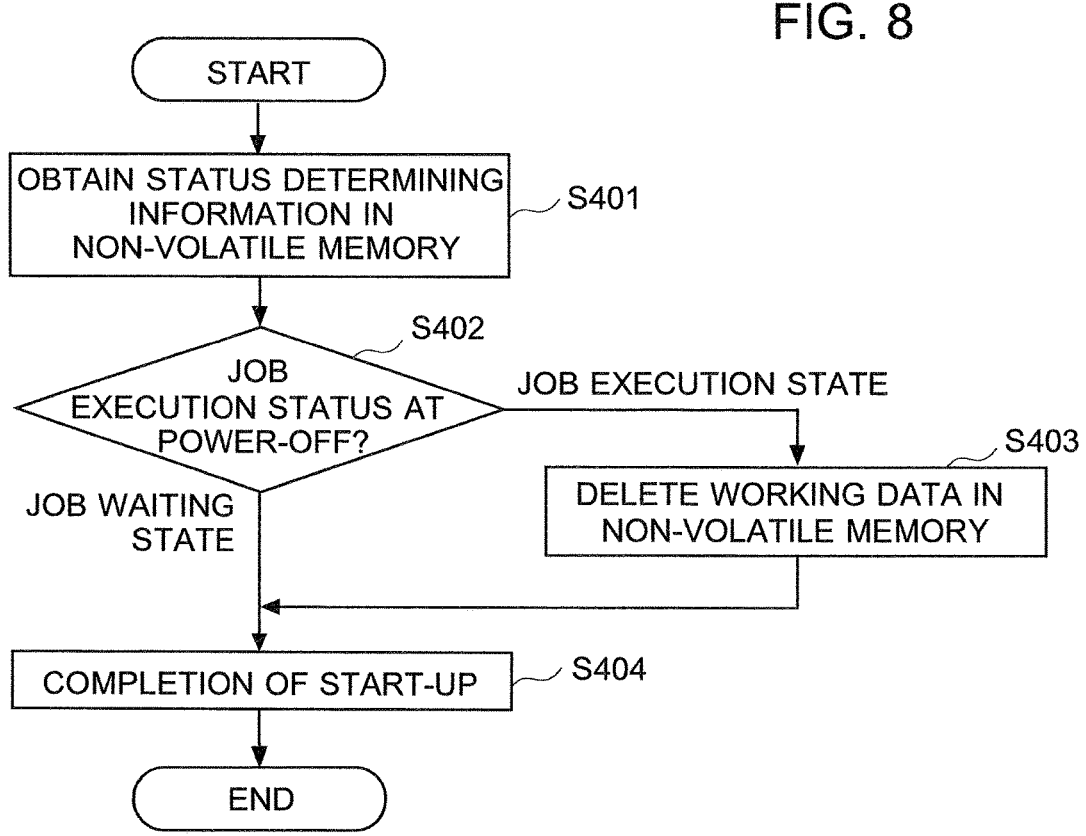
FIG. 8 is a flowchart illustrating an example of the operation (at power-on of the apparatus) of the main controller (control section) of the image forming apparatus of Example 2.

Next, another example of the image forming apparatus, operation control method and non-transitory computer-readable storage medium storing an operation control program will be described with reference to FIGS. 5 to 8. FIG. 5 is a block diagram illustrating the structure of an image forming apparatus of the present example. FIG. 6 is a block diagram illustrating an example of functions activated by a main controller (control section) of the image forming apparatus. FIG. 7 and FIG. 8 are flowcharts illustrating an example of the operation of the main controller (control section) of the image forming apparatus.

In Example 1, descriptions was given to the image forming apparatus such that program monitoring section 103 monitors execution of a job execution program at all times and sets a job execution flag in accordance with whether the job execution is in a job execution state which is a state of executing a job or a job waiting state which is a state of waiting for a job. In the present example, program monitoring section 103 is configured to, at power-off of the image forming apparatus, record information (status determining information) which indicates whether the job execution status is the job execution state or the job waiting state in non-volatile memory 102.

In such an image forming apparatus, main controller 100 needs a certain period of time from a start of a voltage drop of the power of the image forming apparatus to a complete termination of the operation of main controller 100. Therefore, main controller 100 can determine an execution status of a job execution program and record the status determining information in non-volatile memory 102 within the period of time. In order to record the status determining information in non-volatile memory 102 more securely, the image forming apparatus may optionally include temporary power supply 150 which supplies power to main controller 100 temporarily, as illustrated in FIG. 5. Since the power consumption of the process to determine the execution status of the job execution program and record the status determining information in non-volatile memory 102 is sufficiently small and also the period of time required for the process is sufficiently short, the image forming apparatus may employ an electric circuit part which can store electric charge, like a condenser or capacitor, for the temporary power supply 150.

In the present example, since there is a need to detect that the power of the image forming apparatus is going to be turned off, main controller (control section) 100 serves as voltage monitoring section 105 additionally to program monitoring section 103 and matching section 104 as illustrated in FIG. 6.

In concrete terms, voltage monitoring section 105 monitors the voltage of power source 160 applied to the image forming apparatus, and requests program monitoring section 103 to create status determining information when the voltage of power source 160 becomes a predetermined threshold value or less (in response to detecting a voltage drop).

Program monitoring section 103, in response to receiving the request from voltage monitoring section 105, determines a status of execution the job execution program and records status determining information indicating whether a job execution status is the job execution state or the job waiting state, in non-volatile memory 102 before the operation of main controller 100 stops. In the present example, there is no need to change the status determining information in accordance with the actual execution status of the program. For example, program monitoring section 103 may record the status determining information in non-volatile memory 102 only when the job execution is in the job execution state at power-off of the apparatus. In view of that, in the present example, there is no need to use the flag as described in Example 1 for the status determining information.

At power-on of the image forming apparatus, matching section 104 refers to the status determining information stored in non-volatile memory 102 and determines whether the job execution status at the last power-off of the apparatus was the job execution state. If determining that the job execution status at the last power-off was the job execution state (a job was executed), since working data on which job processing was partially executed is stored in non-volatile memory 102, matching section 104 determines that an execution status of the program and an operation status of the hardware device do not match (in other words, working data stored in non-volatile memory 102 and settings of the hardware device do not match). Then, matching section 104 deletes the working data stored in non-volatile memory 102.

The voltage monitoring section 105, program monitoring section 103 and matching section 104 may be provided as hardware devices. Alternatively, the voltage monitoring section 105, program monitoring section 103 and matching section 104 may be provided by a software (operation control program) which causes the control section 100 to function as these sections when being executed. That is, the control section 100 may be configured to serve as the voltage monitoring section 105, program monitoring section 103 and matching section 104, when CPU 101 executes the operation control program.

Hereinafter, description is given to the operation of the main controller 100 of the image forming apparatus having the above structure of the present example, with reference to FIG. 7 and FIG. 8. CPU 101, when executing an operation control program stored in non-volatile memory 102, executes the processes of the steps of the flowcharts illustrated in FIG. 7 and FIG. 8.

Operation at Power-Off:

As illustrated in FIG. 7, under the condition that non-volatile memory 102 stores a program to be executed and working data created by execution of the program and main controller 100 (voltage monitoring section 105) is executing the program, main controller 100 (voltage monitoring section 105) monitors the voltage of power source 160 applied to the image forming apparatus (S301). In response to main controller 100 (voltage monitoring section 105) detecting a drop of the voltage of power source 160 (YES of S301), main controller 100 (program monitoring section 103) determines whether a job execution status is a state of executing a job or a state of waiting for a job in accordance with the execution status of the program and records status determining information in non-volatile memory 102 based on a result of the determination, before the operation of main controller 100 of the image forming apparatus stops (S302). After that, the image forming apparatus goes into the power-off state.

Operation at Power-On:

As illustrated in FIG. 8, when the power of the image forming apparatus is turned on after the power-off, main controller 100 (matching section 104) obtains the status determining information recorded in non-volatile memory 102 (S401). Then, on the basis of the obtained status determining information, main controller 100 (matching section 104) determines whether the job execution status at the last power-off was a state of executing a job (job execution state) or a state of waiting for a job (job waiting state), in other words, determines whether working data in non-volatile memory 102 and settings of a hardware device such as image reading unit 110, image processing unit 120 and image forming unit 130 match or not (S402).

If the job execution status at the last power-off was the state of waiting for a job, main controller 100 (matching section 104) determines that the working data and the settings of the hardware device match, and determines that the start-up processing of the apparatus has been completed (S404). On the other hand, if the job execution status at the last power-off was the state of executing a job, main controller 100 (matching section 104) determines that the working data and the settings of the hardware device do not match, deletes working data in non-volatile memory 102 (S403) and then determines that the start-up processing has been completed (S404).

As described above, the main controller 100 monitors the voltage of the power source to detect power-off of the apparatus. At power-off of the apparatus, the main controller 100 determines an execution status of the program and records in non-volatile memory 102 status determining information which indicates that a job execution status is the job execution state or the job waiting state, determined in accordance with the execution status of the program. At the next power-on of the apparatus, the main controller 100 determines the job execution status at the last power-off of the apparatus on the basis of the status determining information. If the job execution was in the job execution state at the last power-off of the apparatus, the main control section 100 deletes working data in non-volatile memory 102. This control makes working data in non-volatile memory 102 and settings of the hardware device match at all times, in other words, coordinate the execution of the program and the operation of the hardware device at all times.

As described in Example 1, if the image forming apparatus is configured to store a program counter in non-volatile memory 102, the examination of an interrupted program resumes immediately after power-on of the apparatus (before execution of the operation control program of the present example starts). In view of that, similarly to Example 1, the main controller 100 may be configured to generate a high-priority interrupt and does not resume the interrupted program at power-on of the apparatus, so as to execute the operation control program of the present example first.

Example 3

Figure 9:
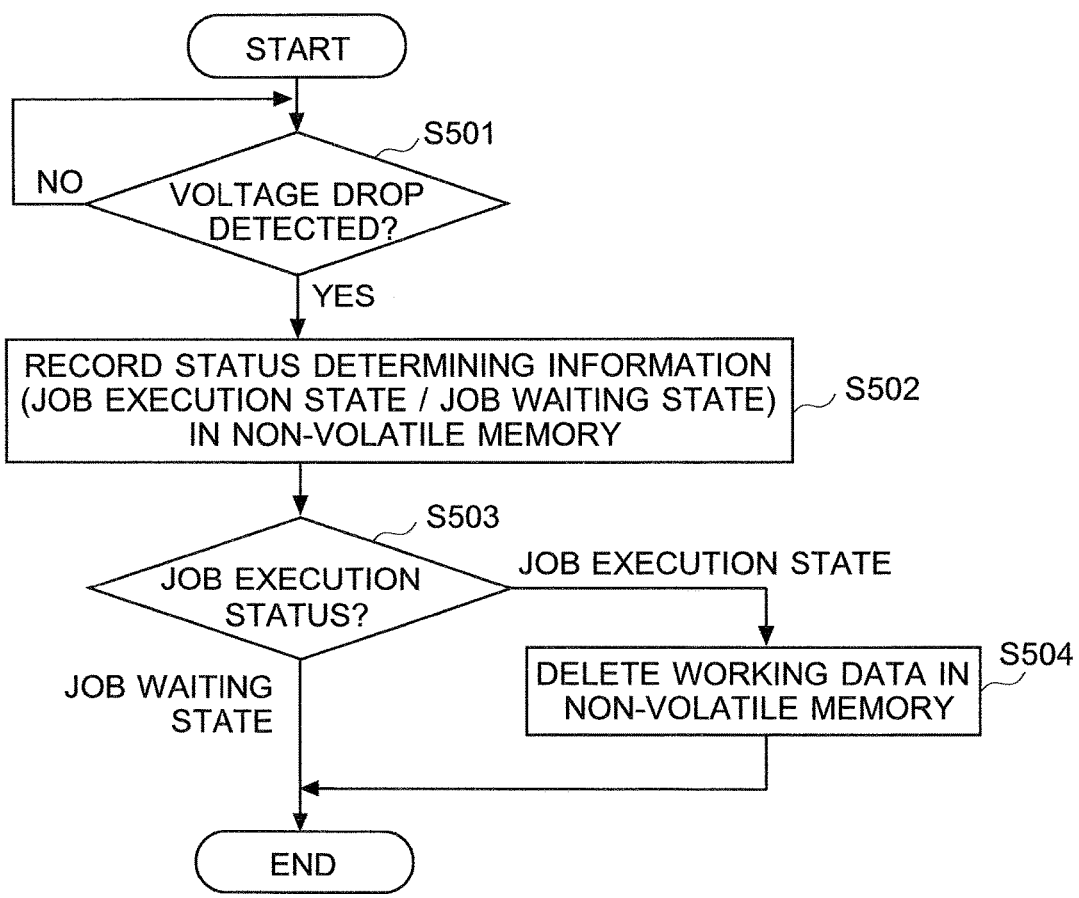
FIG. 9 is a flowchart illustrating an example of the operation (at power-off of the apparatus) of the main controller (control section) of the image forming apparatus of Example 3.

Next, another example of the image forming apparatus, operation control method and non-transitory computer-readable storage medium storing an operation control program will be described with reference to FIG. 9. FIG. 9 is a flowchart illustrating an example of the operation of the main controller (control section) of the image forming apparatus.

In Example 1 and Example 2, descriptions was given to the image forming apparatus such that, at the next power-on of the apparatus, matching section 104 determines whether working data in non-volatile memory 102 and settings of the hardware device match and deletes working data in non-volatile memory 102 on determining that the working data and the settings of the hardware device do not match. In the present example, matching section 104 is configured to perform these processes at power-off of the image forming apparatus.

In such an image forming apparatus, main controller 100 needs a certain period of time from a start of a voltage drop of the power of the image forming apparatus to a complete termination of the operation of the image forming apparatus (especially, main controller 100). Therefore, main controller 100 can determine whether working data in non-volatile memory 102 and settings of the hardware device match in accordance with the job execution status and delete working data in non-volatile memory 102 if determined that they do not match, within the period of time. In order to perform these processes more securely, the image forming apparatus may optionally include temporary power supply 150 which supplies power to main controller 100 temporarily, similarly to the structure of Example 2 illustrated in FIG. 5. The image forming apparatus may employ an electric circuit part which can store electric charge, like a condenser or capacitor, for the temporary power supply 150.

The structure of main controller (control section) 100 is the same as that of Example 2 as illustrated in FIG. 6, and main controller (control section) 100 may serve as voltage monitoring section 105, program monitoring section 103 and matching section 104. The voltage monitoring section 105, program monitoring section 103 and matching section 104 may be provided as hardware devices. Alternatively, the voltage monitoring section 105, program monitoring section 103 and matching section 104 may be provided by an operation control program which causes the control section 100 to function as these sections when being executed. That is, the control section 100 may be configured to serve as the voltage monitoring section 105, program monitoring section 103 and matching section 104, when CPU 101 executes the operation control program.

Hereinafter, description is given to the operation of the main controller 100 of the image forming apparatus having the above structure of the present example, with reference to FIG. 9. CPU 101, when executing an operation control program stored in non-volatile memory 102, executes the processes of the steps of the flowchart illustrated in FIG. 9.
Operation at Power-Off:

As illustrated in FIG. 9, under the condition that non-volatile memory 102 stores a program to be executed and working data created by execution of the program and main controller 100 (voltage monitoring section 105) is executing the program, main controller 100 (voltage monitoring section 105) monitors the voltage of power source 160 applied to the image forming apparatus (S501). In response to main controller 100 (voltage monitoring section 105) detecting a drop of the voltage of power source 160 (YES of S501), main controller 100 (program monitoring section 103) determines whether a job execution status is a state of executing a job or a state of waiting for a job in accordance with an execution status of the program and records status determining information in non-volatile memory 102 based on a result of the determination, before the operation of main controller 100 of the image forming apparatus stops (S502). In the present example, since the main controller 100 is configured to perform the matching process at power-off of the apparatus, there is no need for main controller 100 (program monitoring section 103) to record the status determining information in non-volatile memory 102. The main controller 100 (program monitoring section 103) may inform matching section 104 about whether the job execution status is the job execution state or the job waiting state, in place of recoding the status determining information.

Next, on the basis of the status determining information stored in non-volatile memory 102 (or on the basis of the information given by program monitoring section 103), main controller 100 (matching section 104) determines whether the job execution status is the job execution state or the job waiting state, in other words, determines whether working data in non-volatile memory 102 and settings of a hardware device such as image reading unit 110, image processing unit 120 and image forming unit 130 will match at the next power-on (S503).

If the job execution status is in the job waiting state, main controller 100 (matching section 104) determines that the working data and the settings of the hardware device will match, and the power of the apparatus is turned off without performing a process to delete working data. On the other hand, if the job execution status is in the job execution state, main controller 100 (matching section 104) determines that the working data and the settings of the hardware device will not match, deletes working data in non-volatile memory 102 (S504) and then the power of the apparatus is turned off.

As described above, at power-off of the apparatus, the main controller 100 determines whether the job execution status is the job execution state or the job waiting state, and on determining that the job execution is in the job execution state, deletes working data in non-volatile memory 102 and then turns the power of the apparatus off. This control securely makes working data in non-volatile memory 102 and settings of the hardware device match at the next power-on, in other words, coordinate the execution of the program and the operation of the hardware device at all times.

Incidentally, the present invention should not be limited to the above-mentioned embodiments and examples and unless deviating from the intention of the present invention, the constitution of the image forming apparatus and the operation control method may be changed appropriately.

For example, in the above-described examples, description was given to the operation control of the image forming apparats in which the execution of a job execution program controls hardware devices including image reading unit 110, image processing unit 120 and image forming unit 130. However, it should be noted that a hardware device to be subject to the above-described control is not limited to those and the operation control method can be applied similarly to other hardware devices to be used in execution of a job execution program (for example, a facsimile transmitter-receiver).

Further, in the above-described examples, an image forming apparatus was cited as an example of an apparatus on which the operation control is performed. However, the above-described operation control is applicable similarly to arbitrary apparatuses each of which includes a non-volatile memory for storing working data, which is created and referred to by a program, and includes at least one hardware device to be controlled by execution of the program.

The embodiments and examples of the present invention are applicable to apparatuses including a non-volatile memory which forms a storage area, and, methods of controlling operation of the apparatus and non-transitory computer-readable media each storing a program for controlling the operation of the apparatus with such a method.

Although embodiments and examples of the present invention has been described and illustrated in detail, it is clearly understood that the same is by way of illustrated and example only and is not to be taken by way of limitation, the scope of the present invention being interpreted by terms of the appended claims.

The invention claimed is:

1. An image forming apparatus, comprising:
   a control section including:
      a central processing unit (CPU); and
      a non-volatile memory which is readable and writeable, is capable of retaining stored information regardless of whether or not power is supplied to the non-volatile memory, and stores (i) a job execution program which, when executed by the CPU, controls the CPU to execute job processing, and (ii) working data created by execution of the job execution program; and
   a hardware device that is controlled by execution of the job execution program,
   wherein the job execution program, when executed by the CPU, controls the CPU to execute the job processing while referring to the working data recorded in the non-volatile memory,
   wherein the hardware device starts in an initialized state at start-up of the image forming apparatus, and
   wherein the CPU is configured to:
      in accordance with a status of execution of the job execution program, perform first determining as to whether a job execution status at power-off of the image forming apparatus is a state of executing a job or a state of waiting for a job, the first determining including monitoring the status of the execution of the job execution program, and recording, in the non-volatile memory, status determining information indicating whether the job execution status is the state of executing a job or the state of waiting for a job,
      based on a result of performing the first determining and the status determining information recorded in the non-volatile memory, perform second determining as to whether a status of execution of the job execution program and a status of operation of the hardware device controlled by the execution of the job execution program match at the start-up of the image forming apparatus after the power-off, and
      on determining that the status of the execution of the job execution program and the status of the operation of the hardware device do not match at the start-up of the image forming apparatus after the power-off, delete the working data recorded at the power-off in the non-volatile memory.

2. The image forming apparatus of claim 1, wherein the CPU is configured to determine that the status of the execution of the job execution program and the status of the operation of the hardware device do not match at the start-up of the image forming apparatus after the power-off, when the job execution status at the power-off of the image forming apparatus is the state of executing a job and the non-volatile memory stores the working data recorded at the power-off.

3. The image forming apparatus of claim 1, wherein the CPU is configured to:
   monitor a voltage of a power source of the image forming apparatus and detect a drop of the voltage to a predetermined value or less, and
   in response to detecting the drop of the voltage, record, in the non-volatile memory, the status determining information indicating whether the job execution status is the state of executing a job or the state of waiting for a job, the status determining information being determined in accordance with the status of the execution of the job execution program before operation of the image forming apparatus stops.

4. The image forming apparatus of claim 3, wherein the CPU is configured to determine that the status of the execution of the job execution program and the status of the operation of the hardware device do not match at the start-up of the image forming apparatus after the power-off, when the job execution status at the power-off of the image forming apparatus is the state of executing a job and the non-volatile memory stores the working data recorded at the power-off.

5. The image forming apparatus of claim 1, wherein the CPU is configured to:
   monitor a voltage of a power source of the image forming apparatus and detect a drop of the voltage to a predetermined value or less, and
   in response to detecting the drop of the voltage, determine whether the job execution status is the state of executing a job or the state of waiting for a job, in accordance with the status of the execution of the job execution program, before operation of the image forming apparatus stops.

6. The image forming apparatus of claim 5, wherein the CPU is configured to determine that the status of the execution of the job execution program and the status of the operation of the hardware device do not match at the start-up of the image forming apparatus after the power-off, when the job execution status at the power-off of the image forming apparatus is the state of executing a job and the non-volatile memory stores the working data recorded at the power-off.

7. The image forming apparatus of claim 1, wherein the hardware device includes one of a scanner that optically scans an original to obtain an image, an application-specific integrated circuit (ASIC) that performs image processing, and a print engine that forms an image on a sheet of paper.

8. A method of controlling operation of an image forming apparatus which includes a control section and a hardware device, the control section including a central processing unit (CPU) and a non-volatile memory which is readable and writeable, is capable of retaining stored information regardless of whether or not power is supplied to the non-volatile memory, and stores (i) a job execution program which, when executed by the CPU, causes the CPU to execute job processing, and (ii) working data created by execution of the job execution program, the hardware device being controlled by execution of the job execution program, the job execution program, when executed by the CPU, controlling the CPU to execute job processing while referring to the working data recorded in the non-volatile memory, the hardware device starting in an initialized state at start-up of the image forming apparatus, and the method comprising:

in accordance with a status of execution of the job execution program, perform first determining as to whether a job execution status at power-off of the image forming apparatus is a state of executing a job or a state of waiting for a job, the first determining including monitoring the status of the execution of the lob execution program, and recording, in the non-volatile memory, status determining information indicating whether the lob execution status is the state of executing a job or the state of waiting for a job;

based on a result of the first determining and the status determining information recorded in the non-volatile memory, perform second determining as to whether a status of execution of the job execution program and a status of operation of the hardware device controlled by the execution of the job execution program match at the start-up of the image forming apparatus after the power-off; and on determining that the status of the execution of the job execution program and the status of the operation of the hardware device do not match at the start-up of the image forming apparatus after the power-off, deleting the working data recorded at the power-off in the non-volatile memory.

9. The method of claim 8, wherein the second determining includes determining that the status of the execution of the job execution program and the status of the operation of the hardware device do not match at the start-up of the image forming apparatus after the power-off, when the job execution status at the power-off of the image forming apparatus is the state of executing a job and the non-volatile memory stores the working data recorded at the power-off.

10. The method of claim 8, further comprising:
monitoring a voltage of a power source of the image forming apparatus and detecting a drop of the voltage to a predetermined value or less,
wherein the first determining includes, in response to detecting the drop of the voltage, recording, in the non-volatile memory, the status determining information indicating whether the job execution status is the state of executing a job or the state of waiting for a job, the status determining information being determined in accordance with the status of the execution of the job execution program before operation of the image forming apparatus stops.

11. The method of claim 10, wherein the second determining includes determining that the status of the execution of the job execution program and the status of the operation of the hardware device do not match at the start-up of the image forming apparatus after the power-off, when the job execution status at the power-off of the image forming apparatus is the state of executing a job and the non-volatile memory stores the working data recorded at the power-off.

12. The method of claim 8, further comprising:
monitoring a voltage of a power source of the image forming apparatus and detecting a drop of the voltage to a predetermined value or less,
wherein the first determining includes, in response to detecting the drop of the voltage, determining whether the job execution status is the state of executing a job or the state of waiting for a job, in accordance with the status of the execution of the job execution program, before operation of the image forming apparatus stops.

13. The method of claim 12, wherein the second determining includes determining that the status of the execution of the job execution program and the status of the operation of the hardware device do not match at the start-up of the image forming apparatus after the power-off, when the job execution status at the power-off of the image forming apparatus is the state of executing a job and the non-volatile memory stores the working data recorded at the power-off.

14. The method of claim 8, wherein the hardware device includes one of a scanner that optically scans an original to obtain an image, an application-specific integrated circuit (ASIC) that performs image processing, and a print engine that forms an image on a sheet of paper.

15. A non-transitory computer-readable storage medium storing a program for controlling operation of an image forming apparatus which includes a control section and a hardware device, the control section including a central processing unit (CPU) and a non-volatile memory which is readable and writeable, is capable of retaining stored information regardless of whether or not power is supplied to the non-volatile memory, and stores (i) a job execution program which, when executed by the CPU, causes the CPU to execute job processing, and (ii) working data created by execution of the job execution program, the hardware device being controlled by execution of the job execution program, the job execution program, when executed by the CPU, controlling the CPU to execute job processing while referring to the working data recorded in the non-volatile memory, the hardware device starting in an initialized state at start-up of the image forming apparatus, and the program for controlling operation of the image forming apparatus, when being executed by the CPU, controls the CPU to perform processing comprising:

in accordance with a status of execution of the job execution program, perform first determining as to whether a job execution status at power-off of the image forming apparatus is a state of executing a job or a state of waiting for a job, the first determining including monitoring the status of the execution of the lob execution program, and recording, in the non-volatile memory, status determining information indicating whether the lob execution status is the state of executing a job or the state of waiting for a job;

based on a result of the first determining and the status determining information recorded in the non-volatile memory, perform second determining as to whether a status of execution of the job execution program and a status of operation of the hardware device controlled by the execution of the job execution program match at the start-up of the image forming apparatus after the power-off; and on determining that the status of the execution of the job execution program and the status of the operation of the hardware device do not match at the start-up of the image forming apparatus after the power-off, deleting the working data recorded at the power-off in the non-volatile memory.

\* \* \* \* \*